July 13, 1926.
H. F. FORSTER
TOOL
Filed Jan. 19, 1924
1,592,092
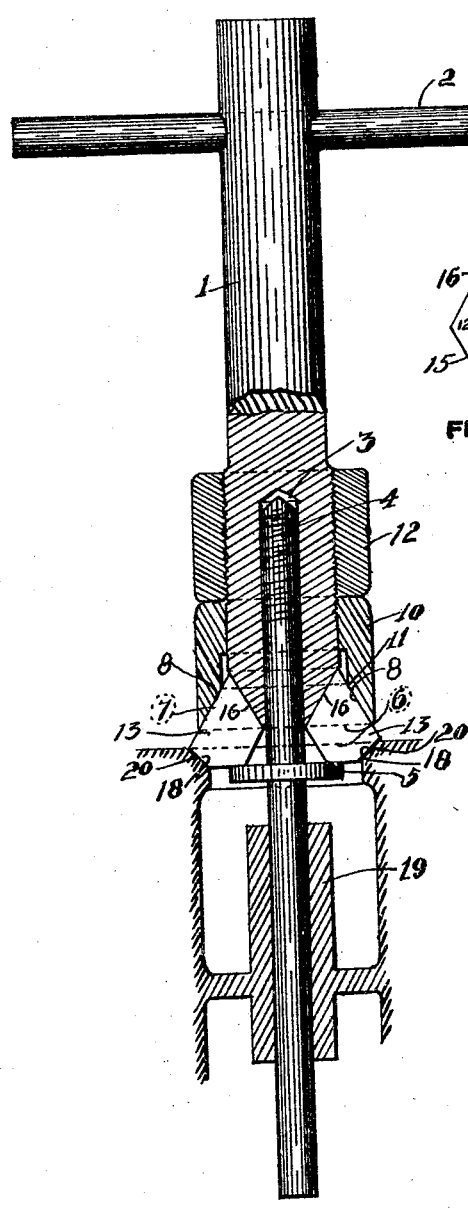
FIGURE 1
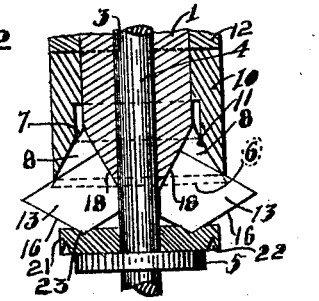
FIGURE 2
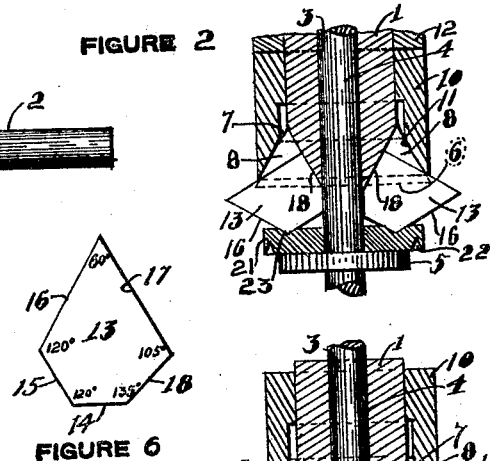
FIGURE 6
FIGURE 3
FIGURE 4
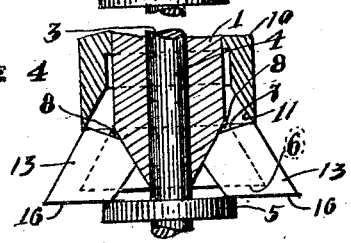
FIGURE 5
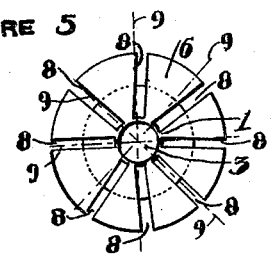
INVENTOR
Hans Fred Forster
BY John A. Naismith
ATTORNEY Patented July 13, 1926.

1,592,092

UNITED STATES PATENT OFFICE.

HANS FRED FORSTER, OF SAN JOSE, CALIFORNIA, ASSIGNOR OF FORTY-FIVE ONE-HUNDREDTHS TO PAUL L. BECK, OF SAN JOSE, CALIFORNIA.

TOOL.

Application filed January 19, 1924. Serial No. 687,385.

This invention relates particularly to a tool for boring, facing or reseating the valve seats of engines.

It is the object of the invention to provide a tool of the character indicated that is provided with a plurality of interchangeable plates or blades; that is provided with blades having a plurality of cutting edges and reversible to present cutting edges of any desired angle; in which the blades are unequally spaced about a common center; and finally, to provide a simple, effective holder for the blades in their several positions.

In the drawing:—

Figure 1 is a longitudinal section through a device embodying my invention with the blades presenting cutting edges for work on a 45° valve seat.

Figure 2 is a section of a portion of the device with the blades set to cut a 30° valve seat.

Figure 3 is a section of a portion of the device with the blades set to cut a 60° valve seat.

Figure 4 is a section of a portion of the device with the blades set to face a valve seat.

Figure 5 is an end view of the body portion of the device.

Figure 6 is a detail view of one of the blades.

Referring more particularly to the drawing, 1 indicates a cylindrical body portion fitted with handle 2 and having one end bored and threaded as at 3 to engage the threaded end of a pilot rod 4, this rod having an annular flange formed thereon as at 5. This end of part 1 is expanded to form a head with a substantially flat outer surface 6 and a bevelled under surface 7, the bevel being, preferably, at an angle of 30° to the axis of part 1, or 60° to a plane intersecting the axis of part 1 at right angles.

Radially arranged in said head are a plurality of slots 8, each slot being cut in from the outer edge of the head and having a bottom surface at an angle of 30° to its axis and extending from the base of the bevelled surface 7 to the end of bore 3 where it communicates with surface 6. These slots 8 are preferably unequally spaced as shown in Figure 5, where the center lines 9 are shown equally spaced and the slots 8 offset therefrom.

Slidably mounted on the end of part 1 is a sleeve 10 presenting a bevelled end 11 in opposed relation to the bevelled surface 7 of part 1. Threaded upon part 1 is a nut 12 adapted to engage sleeve 10.

At 13 are a plurality of mutually equilateral and mutually equiangular blades of steel adapted to be removably inserted in slots 8. Each blade in the present instance is in the form of a pentagon, the several edges being indicated by the reference numerals 14—15—16—17—18, the edges 14—15 being at an angle 120° to each other, edges 15—16 at an angle of 120° to each other, edges 16—17 at an angle of 60° to each other, edges 17—18 at an angle of 105° to each other, and edges 18—14 at an angle of 135° to each other.

If, now, the blades be inserted in the slots 8 with their edges 16 engaging the bottoms of slots 8, the pilot 4 screwed into position against edges 14 and sleeve 10 forced into firm contact with edges 17 by means of nut 12, they will present their edges 18 in perfect annular alignment. With the pilot rod inserted in the guide 19 the several blades will present their cutting edges 18 to the valve seat 20 at an angle of 45° to the axis of the said seat and to the plane in which the said seat lies.

If the valve seat is to be cut at an angle of 30° to the plane in which it lies then the blades are inserted as shown in Figure 2, engaging groove 23 in plate 21.

If a straight facing is desired then the blades are arranged as shown in Figure 4.

If the angle of the valve seat is 70° then the blades are positioned as shown in Figure 3, but since the plane surface of flange 5 will not securely hold the acute angled points formed by edges 16—17 it is necessary to insert a plate 21 having an annular groove 22 formed therein as shown.

It may now be seen that I have provided a device that may be quickly adjusted to perform work on various forms of valve seats without the necessity of providing several sets of blades, the one set of blades provided being so formed as to meet all ordinary requirements. Not only are the blades quickly changed or replaced but their deep seating in slots 8 and binding between flange 5 and sleeve 10 render them positive and accurate in operation.

An important feature in this construction is that it permits the unequal spacing of the blades. If the blades are equally spaced and a hole is encountered each time a blade engages that hole all the other blades are accordingly effected with the result that a series of equally spaced indentations are formed in the seat. If the blades are unequally spaced, however, each successive engagement of the blades with the hole finds the positions of all the other blades relative to the surface being worked altered so that a perfectly smooth surface is secured.

Another important feature of this construction is, that it may be readily assembled and disassembled without the use of a wrench, a feature that renders it highly desirable in its practical application.

Still another important feature of this invention as disclosed in Figure 1 is that the expansion of the several blades is effected by retracting sleeve 10 on portion 1 and advancing rod 4 relative thereto and the retraction is effected by the advancing of the said sleeve and retracting said rod, this varying of the position of sleeve 10 causing the said blades to be differently seated on the bevelled bottom of slots 8.

It is to be understood, of course, that while I have herein shown and described one specific embodiment of the invention, changes in form, construction, and method of operation may be made within the scope of the appended claims.

I claim:—

1. A tool comprising a supporting element having radially arranged slots provided with bevelled bottom surfaces formed in one end thereof, a pilot rod axially mounted therein, a plurality of mutually equiangular and mutually equilateral blades having a plurality of cutting edges arranged in said slots, and adjustable means for securing said blades in said slots.

2. A tool comprising a supporting element having a pilot rod arranged in one end thereof in axial alignment therewith, a plurality of duplicate independent blades, means for supporting said blades radially in the end of said element, means mounted on said pilot rod and provided with a groove for engaging said blades, and means mounted on said element and cooperating with the means carried by said rod for fixedly securing said blades in said support.

3. A tool comprising a supporting element having radially arranged slots provided with bevelled bottom surfaces formed in one end thereof, a pilot rod threaded into said end in axial alignment therewith, a blade arranged in each slot in slidable engagement with its bevelled surface, a flange carried by said rod to engage said blades in opposed relation to said bevelled surfaces, a sleeve slidably mounted on said element to engage said blades, and a nut threaded on to said element to engage said sleeve and force the same into positive engagement with said blades, whereby to cooperate with the said flange and the bevelled bottom surfaces of said slots to secure the blades in position.

4. A tool comprising a supporting element having radially arranged slots provided with bevelled bottom surfaces formed in one end thereof, a pilot rod threaded into said end in axial alignment therewith, a blade arranged in each slot, a flange carried by said rod to engage said blades, a sleeve slidably mounted on said element to engage said blades, and a nut threaded on to said element to engage said sleeve and force the same into positive engagement with said blades.

5. A tool comprising a supporting element having radially arranged slots provided with bevelled bottom surfaces formed in one end thereof, a pilot rod axially mounted therein and provided with blade engaging means, a plurality of mutually equiangular and mutually equilateral blades having a plurality of cutting edges arranged in said slots, and means mounted on said supporting element to cooperate with said blade engaging means to rigidly support said blades.

6. A tool comprising a supporting element having radially arranged slots formed in one end thereof and provided with bevelled bottom surfaces inclined toward said end, means for centering said support in axial alignment with a valve seat, a plurality of mutually equiangular and mutually equilateral blades having a plurality of cutting edges arranged in said slots, and means for securing said blades in said slots.

7. A tool comprising a supporting element having radially arranged slots provided with bevelled bottom surfaces formed in one end thereof, an axially adjustable pilot rod mounted in said element, a flange carried by said rod, a plurality of mutually equiangular and mutually equilateral blades mounted in said slots to engage said flange, and means adjustably mounted on said element to engage said blades and urge them against said flange.

8. A tool comprising a supporting element having radially arranged slots formed in one end thereof, a pilot rod mounted in axial alignment therewith, a blade mounted in each slot, a flange carried by said rod to engage said blades, and means adjustably mounted on said element to engage said blades and secure them in position against said flange.

9. A tool comprising a supporting element having radially arranged slots provided with bevelled bottom surfaces formed in one end thereof, a plurality of mutually equiangular and mutually equilateral blades having a plurality of cutting edges symmetrically arranged in said slots in engagement with said bevelled bottom surfaces, and means for locking all of said blades in a given position on said bevelled surfaces.

HANS FRED FORSTER.